United States Patent
Jurmain et al.

[11] Patent Number: 6,089,873
[45] Date of Patent: Jul. 18, 2000

[54] METHOD FOR TRAINING A PERSON TO PROPERLY SUPPORT THE HEAD OF A YOUNG INFANT

[75] Inventors: Mary M. Jurmain, Eau Claire, Wis.; John C. Fusi, New Providence, N.J.

[73] Assignee: Baby Think It Over, Inc., Eau Claire, Wis.

[21] Appl. No.: 09/305,597

[22] Filed: May 5, 1999

Related U.S. Application Data

[62] Division of application No. 08/918,953, Aug. 26, 1997, Pat. No. 5,941,757.

[51] Int. Cl.⁷ .............................. G09B 23/28; A63H 3/36
[52] U.S. Cl. ......................... 434/270; 434/262; 446/391
[58] Field of Search ........................... 446/391; 434/262, 434/265, 267, 270, 275

[56] References Cited

U.S. PATENT DOCUMENTS

| | | |
|---|---|---|
| 3,303,605 | 2/1967 | Henry . |
| 3,319,376 | 5/1967 | Doppelt et al. . |
| 3,685,200 | 8/1972 | Noll . |
| 3,740,871 | 6/1973 | Berton et al. ............................ 434/267 |
| 3,866,350 | 2/1975 | Goldfarb et al. . |
| 3,918,199 | 11/1975 | DeMasi . |
| 4,003,157 | 1/1977 | Guerrero . |
| 4,115,948 | 9/1978 | Burks . |
| 4,190,982 | 3/1980 | Rahmstorf . |
| 4,245,429 | 1/1981 | Katzman et al. . |
| 4,249,338 | 2/1981 | Wexler . |
| 4,395,235 | 7/1983 | Becker . |
| 4,575,351 | 3/1986 | Gonzalez . |
| 4,762,494 | 8/1988 | Woods . |
| 4,773,865 | 9/1988 | Baldwin ............................ 434/267 X |
| 4,820,236 | 4/1989 | Berliner et al. . |
| 5,052,969 | 10/1991 | Smith . |
| 5,096,424 | 3/1992 | Carlberg . |
| 5,232,369 | 8/1993 | Mavrikis ................................ 434/262 |
| 5,236,385 | 8/1993 | May . |
| 5,314,339 | 5/1994 | Aponte .................................. 434/267 |
| 5,356,295 | 10/1994 | Grosz ..................................... 434/267 |
| 5,443,388 | 8/1995 | Jurmain et al. . |
| 5,509,810 | 4/1996 | Schertz et al. . |
| 5,540,592 | 7/1996 | Scheinberg et al. .................... 434/265 |
| 5,853,292 | 12/1998 | Eggert et al. ........................... 434/262 |

FOREIGN PATENT DOCUMENTS

| | | | |
|---|---|---|---|
| 0044642 | 1/1982 | European Pat. Off. ............... 434/262 |
| 4308493 | 9/1994 | Germany ................. 434/265 |
| 1 540 078 | 12/1979 | United Kingdom .................... 446/391 |
| 2244843 | 11/1991 | United Kingdom ................... 434/262 |

*Primary Examiner*—D. Neal Muir
*Attorney, Agent, or Firm*—Michael S. Sherrill

[57] ABSTRACT

An infant simulator comprising a doll equipped with a realistically floppy neck and a means for sensing and recording or reporting instances in which the head has not been properly supported during handling and allowed to flop into an unacceptable bent position.

13 Claims, 4 Drawing Sheets

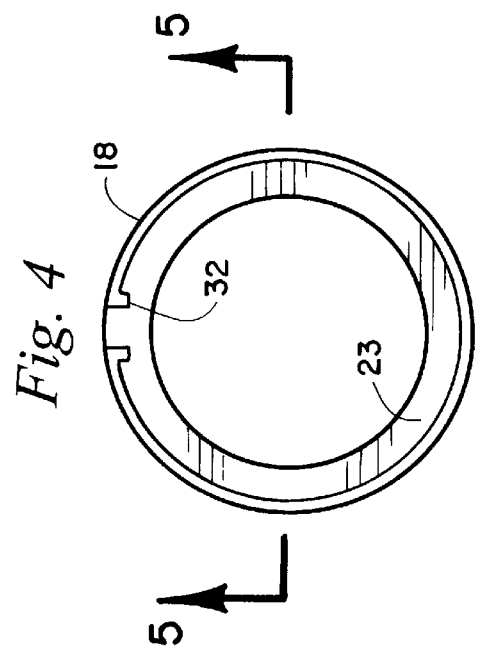
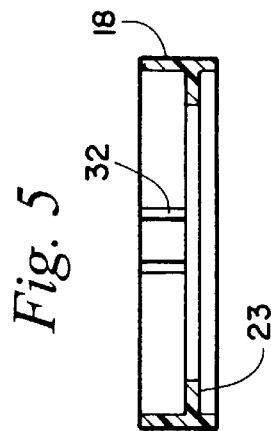
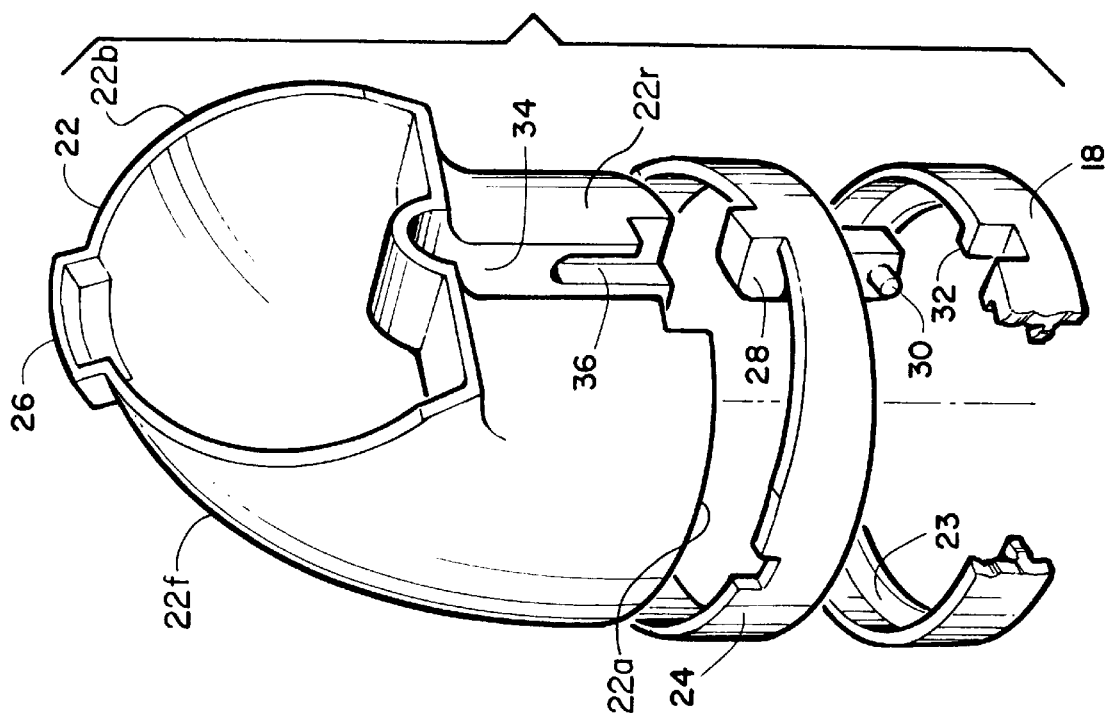

METHOD FOR TRAINING A PERSON TO PROPERLY SUPPORT THE HEAD OF A YOUNG INFANT

This is a divisional of U.S. Pat. application Ser. No. 08/918,953, filed Aug. 26, 1997, now U.S. Pat. No. 5,941,757.

FIELD OF THE INVENTION

This invention broadly relates to the field of simulated child care. More specifically, the invention relates to infant simulators used in educational programs for educating prospective parents about the realities of parenthood, assisting in the education and training of personnel entering the child-care profession, and assisting in the continuing education of persons working in the child-care profession.

BACKGROUND

Teen-age pregnancy is an ever increasing problem. Teen-age parents, surveyed as to why they elected to have a baby, gave such reasons as "babies are so cute," "I wanted attention," "I needed someone to love and love me back." Such romantic feelings toward having a baby almost never include an understanding of the responsibilities imposed by a baby, including loss of sleep, loss of freedom, the need for constant attention, etc. Attempts to educate teen-agers about the trials and tribulations of caring for an infant and raising a child using the traditional educational methods of lecture and readings are rarely successful.

Some resourceful educators, realizing that traditional educational methods are not working, have attempted to demonstrate the care requirements of an infant by requiring students to carry a sack of flour, an egg or a plant throughout an assignment for a period of one to several days. While somewhat exemplary of the care requirements of an infant, such programs do not fairly represent the care requirements of an actual infant and have proven to be of limited success.

U.S. Pat. Nos. 4,115,948 issued to Burks and 5,094,644 issued to Kelley describe dolls that will wet a diaper after being fed from a bottle. Such dolls are not useful for educating students about the trials and tribulations of caring for an infant as the feeding and wetting cycle is under control of the user. The student, unless under constant supervision by an educator, can feed and change the doll on a schedule selected by the student.

U.S. Pat. No. 4,249,338 issued to Wexler disclosed a doll which emits a crying sound when a manually operated switch is actuated. The user must then determine which of several actions (e.g., feeding, diaper changing or back patting) will turn off the crying sound. While interesting as a plaything, this doll suffers from the same drawback as the "feed and wet" dolls in that activation of the crying actuation switch is under control of the user. The student, unless under constant supervision by an educator, can activate the switch and change the doll on a schedule selected by the student.

A particularly useful infant simulator system for use in educating students about the care requirements of an infant is described in U.S. Pat. No. 5,443,388 issued to Jurmain et al. and assigned to the assignee of this application. The infant simulator includes such useful features as periodically crying throughout an assignment period on a schedule which is unknown to the student, with the student required to take appropriate responsive action.

It is well known and understood by those who have cared for an infant that it is absolutely necessary to continuously support the head of the infant whenever the infant is held. Infants are simply incapable of supporting their own head in an upright position for several months after birth. Failure to support the head when handling an infant can result in serious injury should the head flop backward.

A number of dolls have been designed with floppy necks, including the psychotherapy doll disclosed in U.S. Pat. No. 4,762,494 issued to Woods and the training doll disclosed in U.S. Pat. No. 4,575,351 issued to Gonzalez. However, neither of these dolls provide a realistic bending of the neck, (e.g., the neck of the doll disclosed in Gonzalez is simply pinched by a sew line to permit flopping of the head), nor do they include instrumentation to monitor and record undesirable flopping of the head.

Accordingly, there is a continuing need for an improved infant simulator suitable for use in educational programs for educating prospective parents about the realities of parenthood, assisting in the education and training of personnel entering the child-care profession, and assisting in the continuing education of persons working in the child-care profession that realistically demonstrates the head support required by infants and includes a monitoring means for allowing an educator or other instructor to ascertain whether the head has been properly supported by the student throughout an assignment period.

SUMMARY OF THE INVENTION

The infant simulator of the present invention is a doll equipped with a realistically floppy neck and a means for sensing and recording or reporting instances in which the head has not been properly supported during handling and allowed to flop into an unacceptable position.

In a first embodiment, the doll includes a head floppily connected to a torso and is equipped with (i) a head-position sensing unit for sensing the flopped position of the head relative to the torso as between an acceptable position(s) and an unacceptable position(s), and (ii) a data recording unit in communication with the head-position sensing unit for recording a sensed positioning of the head in an unacceptable position. This embodiment is effective for sensing instances in which the head has been allowed to flop into an unacceptable position and recording such instances for subsequent review by a program supervisor.

In a second embodiment, the doll includes a head floppily connected to a torso and is equipped with (i) a head-position sensing unit for sensing the flopped position of the head relative to the torso as between an acceptable position(s) and an unacceptable position(s), and (ii) a signal generating unit in communication with the head-position sensing unit for generating a perceptible distress signal when the head is sensed in an unacceptable position. This embodiment is effective for sensing instances in which the head has been allowed to flop into an unacceptable position and signaling the student (e.g., a scream, a loud cry, a red light, etc.) that the head has flopped into an unacceptable position due to a lack of head support during handling.

The doll may optionally be equipped with both a data recording unit and a signal generating unit in combination with the head-position sensing unit.

A specific embodiment of a floppy neck assembly capable of providing realistic movement of the head relative to the torso, includes (i) a curved neck tube having a first end engaged by a first receiving collar within an opening in the torso and a second end engaged by a second receiving collar within an opening in the head, wherein the neck tube is slidably engaged within at least one of the first and second receiving collars, and (ii) a guiding mechanism for restricting movement of the head relative to the torso between a first position wherein the head is aligned with the torso, and a second position wherein the head is tilted back relative to the torso. The floppy neck assembly is configured and arranged so that the head is gravitationally biased toward the first position (i.e., aligned with the torso) when the torso is in a generally vertical position and gravitationally biased toward the second position (i.e., tilted back relative to the torso) as the torso approaches a generally horizontal position.

The invention further includes a method of training a person to properly support the head of a young infant by assigning the infant simulator of the present invention to the person for an assignment period. When the infant simulator includes a data recording unit, the method can further include a review of the data recorded by the infant simulator during the assignment period and a discussion of such data with the person.

BRIEF DESCRIPTION OF THE DRAWINGS

FIG. 3 is an exploded view of the floppy neck assembly shown in FIGS. 1 and 2.

FIG. 4 is a plan view of the receiving collar attached to the torso shown in FIGS. 2 and 3.

FIG. 5 is a section view of the torso receiving collar shown in FIG. 4 taken along line 5—5 in FIG. 4.

DETAILED DESCRIPTION OF A PREFERRED EMBODIMENT

Figure 2:
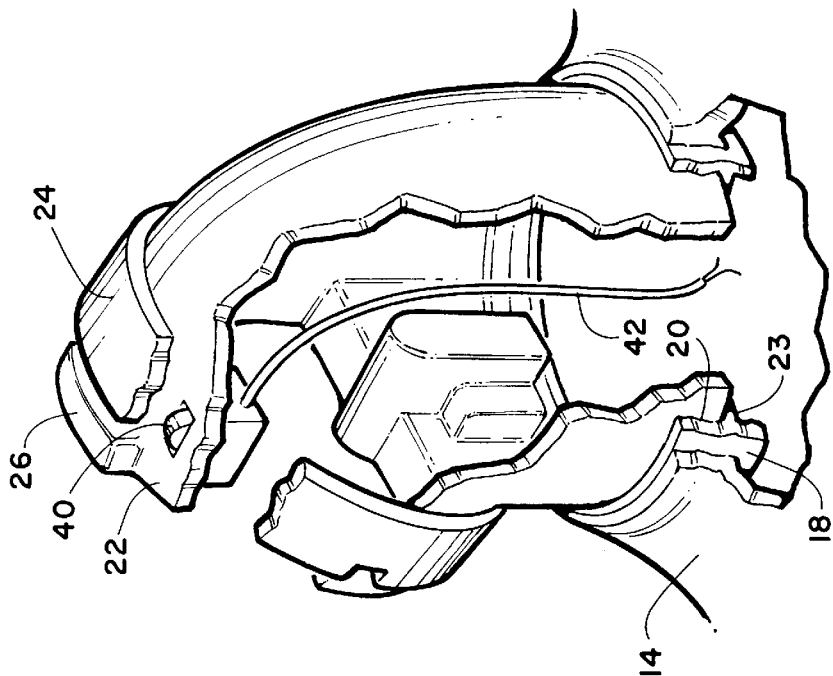
FIG. 2 is a perspective view of the floppy neck assembly shown in FIG. 1, with a portion thereof cut away to reveal internal components.

Definitions p As utilized herein, including the claims, the phrase "assignment period," means the period of time during which the infant simulator is activated and the assigned person or team is given custody of the infant simulator (e.g., overnight, 48 hours, one week).

As utilized herein, including the claims, the phrase "bent-neck episode," refers to the period of time during which the head of the doll is sensed in an unacceptable position. Each bent-neck episode begins when a the head is sensed in an unacceptable position and a bent-neck occurrence recorded and/or a distress signal generated, and ends when the head is sensed in an acceptable position.

As utilized herein, including the claims, the term "doll" means a figure representative of a human being and including at least a portion representing a head and a portion representing a torso. The figure is preferably shaped as an infant and includes arms and legs. Other physical features can be represented as desired, including specifically, but not exclusively, hair, eyes, eye lashes, eyebrows, ears, nose, mouth, hands, fingers, fingernails, areolae, bellybutton, genitalia, feet, toes, toenails, skin pigmentation, and physical deformities.

As utilized herein, including the claims, the phrase "distress period," when used in connection with the generation of a distress signal, means a time period of predetermined duration or bounded random duration beginning immediately or shortly after sensing of an unacceptable positioning of the head.

As utilized herein, including the claims, the term "infant" refers to a young human being ranging in age from a newborn, including a premature newborn, to an approximately one-year old child.

As utilized herein, including the claims, the phrase "perceptible signal" means any and all means of communication capable of conveying notice or warning to a person, including specifically, but not exclusively audible signals (e.g., crying), olfactory signals (e.g., emission of odorous gas), tactile signals (e.g., wet diaper), visual signals (e.g., gesture), and multimedia signals (e.g., crying and tears).

As utilized herein, including the claims, the term "position," includes both the singular and the plural form, such that sensing a "position" includes both sensing a specific singular position, sensing specific multiple positions or sensing a position within a defined range of positions.

As utilized herein, including the claims, the phrase "trip angle," means the angle $\alpha$ at which the head is first sensed as having moved between acceptable and unacceptable positions by a head position sensor. In other words, angles $\alpha$ less than the trip angle represent acceptable head positions which do not result in the recording of a bent-neck occurrence, while angles $\alpha$ greater than and equal to the trip angle represent unacceptable head positions and result in the recording of a bent-neck occurrence.

| Nomenclature | |
|---|---|
| 10 | Infant Simulator or Doll |
| 12 | Curved Neck Tube Assembly |
| 14 | Torso |
| 16 | Head |
| 18 | First Retention Collar |
| 20 | Opening in Torso |
| 21 | Opening in Head |
| 22 | Curved Neck Tube |
| 22a | First End of Neck Tube |
| 22b | Second End of Neck Tube |
| 22f | Front (Smoothly Curved) Surface of Neck Tube |
| 22r | Rear (Sharply Angled) Surface of Neck Tube |
| 23 | Inner Flange in the First Retention Collar |
| 24 | Second Retention Collar |
| 26 | Stop Tab |
| 28 | Finger |
| 30 | Pivot Pins |
| 32 | Notch In First Retention Collar |
| 34 | Closed End Channel |
| 36 | Transverse Grooves |
| 40 | Toggle Switch |
| 42 | Lead Wires |
| 50 | Central Processing Unit |
| 100x | Central Longitudinal Axis Through First Retention Collar |
| 200x | Central Longitudinal Axis Through Second Retention Collar |
| $\alpha$ | Angle Defined by Central Longitudinal Axes 100x and 200x. |

Construction

Figure 1:
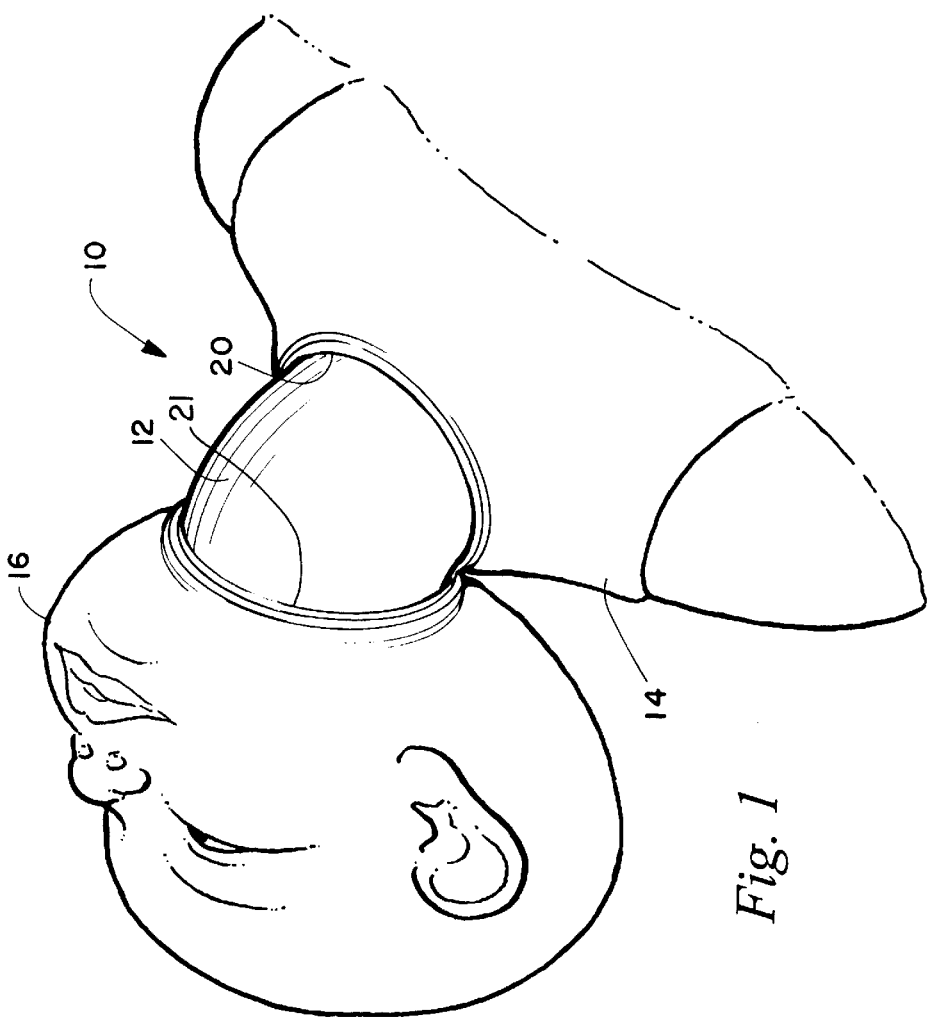
FIG. 1 is a perspective view of an infant simulator equipped with one embodiment of a floppy neck assembly of this invention, with the head flopped backward into an unacceptable position.

As shown in FIG. 1, the infant simulator 10 comprises a doll 10 having a neck assembly 12 connecting a head 16 to a torso 14 in such a manner that the head 16 can flop backward relative to the torso 14 unless properly supported by the care provider. The neck assembly 12 is designed to provide a realistically appearing neck as well as a realistic movement of the head 16 relative to the torso 14 when the head is not properly supported.

The doll 10 preferably has the appearance of a young infant (e.g., approximately 40 to 80 cm in length and approximately 3 to 5 kg in weight). The doll 10 can be sculpted to depict the skin color and facial feature of various ethnic groups including specifically, but not exclusively, African American, Asian, Caucasian, Hispanic, and Native American.

The neck assembly 12 includes a switch 40 that is biased in an open position and closed whenever the head 16 moves a sufficient distance along the curved neck tube 22. When the switch 40 is closed, a bent-neck signal is transmitted along lead wires 42 to a central processing unit 50 of the sort detailed in U.S. Pat. No. 5,443.388 issued to Jurmain et al. and assigned to the assignee of this application. The central processing unit 50 is designed and programmed to (i) record receipt of the bent-neck signal as a bent-neck occurrence and/or (ii) communicate the bent-neck occurrence via a signal generating means capable of producing a distress signal in response to receipt of the bent-neck signal. Other data can also be recorded and/or processed by the central processing unit 50 as desired.

When a distress signal is generated in response to receipt of a bent-neck signal, the central processing unit 50 may optionally continue the distress signal, (e.g., screaming) for a predetermined period of time (e.g., 10 seconds to 10 minutes), much as an infant would be expected to continue screaming and/or crying after experiencing such a traumatic event.

As shown in FIGS. 1–7, the neck assembly 12 includes (i) a curved neck tube 22 having a first end 22a, a second end 22b, a smoothly curved front surface 22f, and a sharply angled rear surface 22r, (ii) a first receiving means, such as a first receiving collar 18, mounted within an opening 20 in the top of the torso 14 for retentively receiving the first end 22a of the curved neck tube 22, and (iii) a second receiving means, such as a second receiving collar 24, mounted within an opening 21 within the bottom of the head 16 for retentively receiving the second end 22b of the curved neck tube 22. The curved neck tube 22 is fixedly secured to one of the retention collars and slidably engaged to the other.

Since the head 16 and torso 14 are preferably constructed of a soft flexible material simulating the skin of an infant, the first 18 and second 24 retention collars provide the structural rigidity necessary to accommodate reciprocating movement of the head 16 relative to the torso 14.

FIGS. 1–7 show an embodiment in which the curved neck tube 22 is fixedly engaged to the torso 14 through the first retention collar 18 and slidably engaged to the head 16 by the second retention collar 24. The first retention collar 18 is fixedly secured to the torso 14 within the neck opening 20 and the second retention collar 24 fixedly secured to the head 16 within the neck opening 21 by any suitable means including adhesive bonding, bead welding, friction fitting, sewing, stapling, etc.

The first end 22a of the curved neck tube 22 extends into the first retention collar 18 and abuts against an inner flange 23 on the first retention collar 18. The first retention collar 18 is fixedly secured in this position by any suitable means, including adhesive bonding, thermal welding, friction fitting, a plurality of latches, a retaining ring, matched threading on the curved neck tube 22 and the first retention collar 18, snap fasteners, etc.

Figure 7:
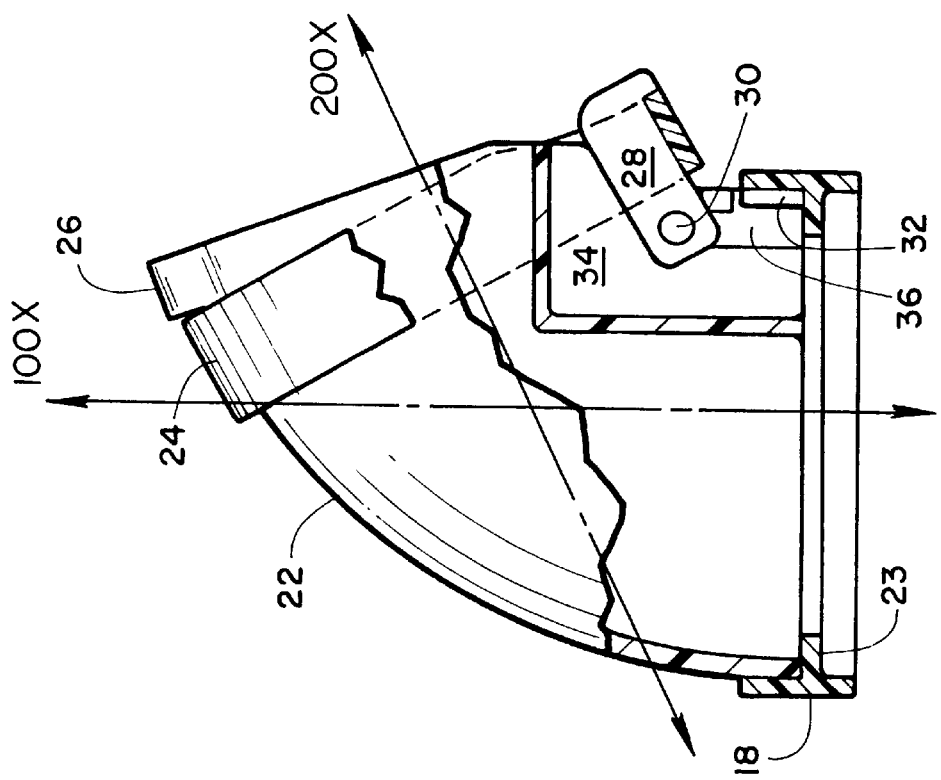
FIG. 7 is a side elevation view of the floppy neck assembly shown in FIG. 6, with a portion thereof cut away to reveal internal components, showing the floppy neck assembly in an unacceptable bent position.
Figure 6:
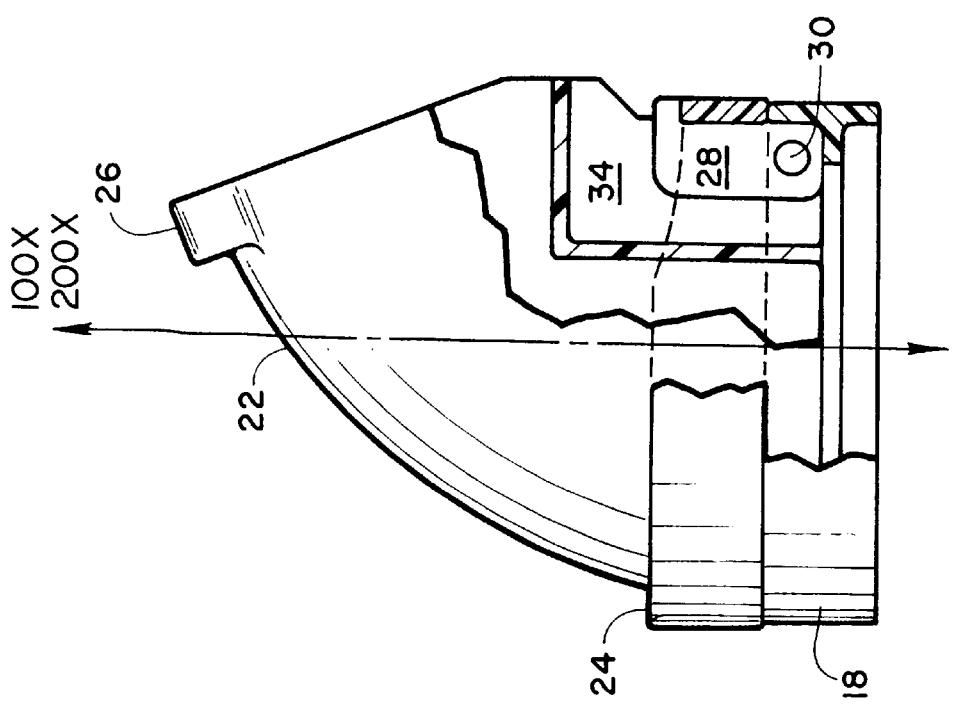
FIG. 6 is a side elevation view of the floppy neck assembly shown in FIGS. 1–3, with a portion thereof cut away to reveal internal components, showing the floppy neck assembly in an acceptable rest position.
Figure 8:
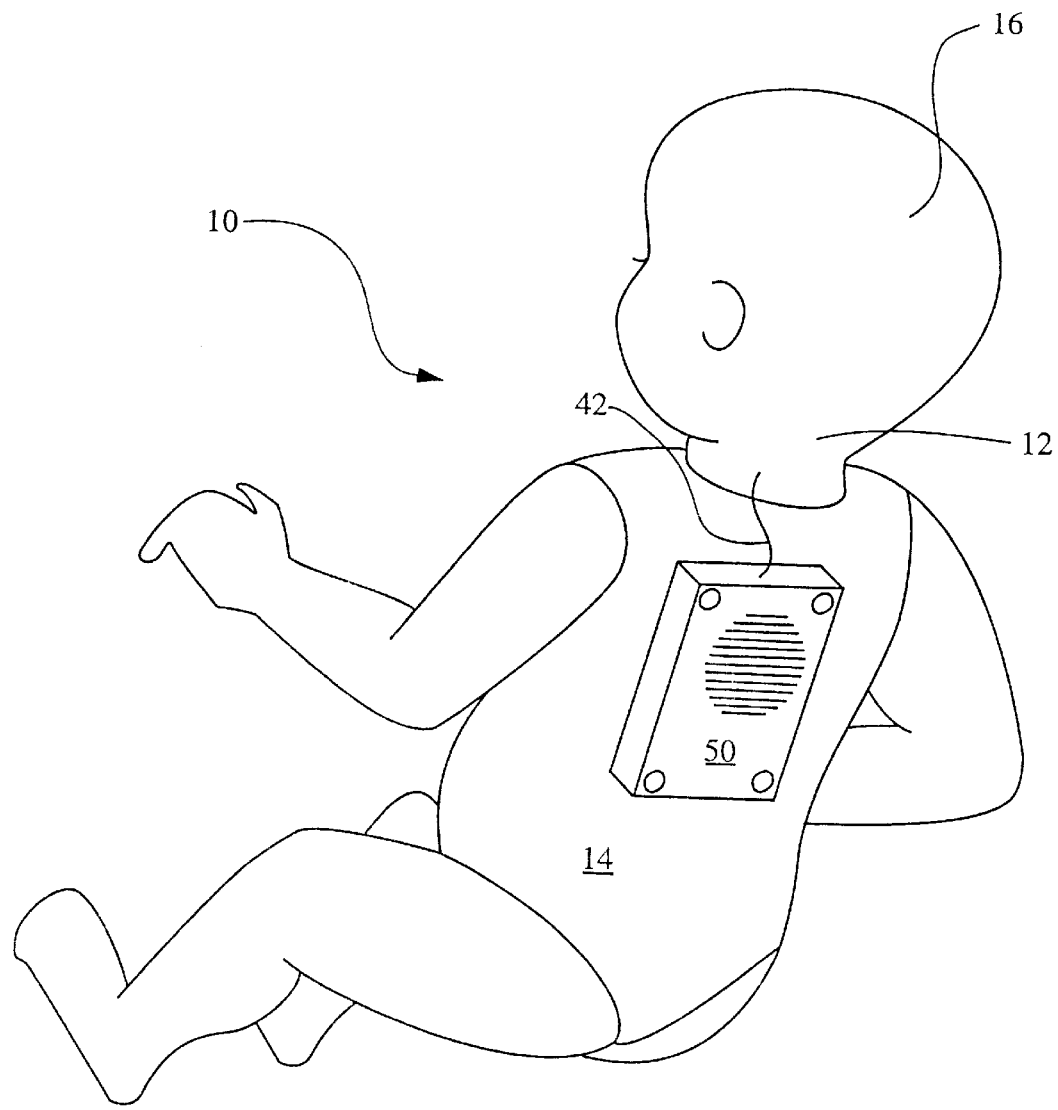
FIG. 8 is a schematic representation of the infant simulator of FIG. 1.

The second retention collar 24 is effective for sliding and/or pivoting motion along the curved neck tube 22 between (i) an acceptable rest position, shown in FIG. 6, with the head 16 and torso 14 aligned (i.e., the central longitudinal axis 100x defined by the first retention collar 18 and the central longitudinal axis 200x defined by the second retention collar 24 axially aligned), and (ii) an unacceptable bent-neck position, shown in FIG. 7, with the head 16 angled backward from the torso 14 (i.e., the central longitudinal axis 200x defined by the second retention collar 24 positioned at a maximum angle $\alpha$ relative to the central longitudinal axis 100x defined by the first retention collar 18). The neck assembly 12 allows the head 16 to initially pivot backward about pivot pins 30 relative to the torso 14 until the head 16 contacts the torso 14. Once the head 16 contacts the torso 14, the head 16 begins to move away from the torso 14 in a relatively linear fashion while continuing to pivot about the pivot pins 30 until linear motion is essentially stopped due to the sharpness of the angle at the back side 22r of the curved neck tube 22. Thereafter the head 16 continues to pivot about pivot pins 30 until the second retention collar 24 contacts an externally extending tab 26 projecting from the front side 22f of the curved neck tube 12 proximate the second end 22b of the neck tube 12. This combination of linear and pivoting movement of the head 16 relative to the torso 14 prevents the torso 14 from interfering with continued movement of the head 16 as the head 16 bends backwards and provides a realistic bending.

Movement of the second retention collar 24 along the curved neck tube 22 is governed by a guiding mechanism (unnumbered). The guiding mechanism includes (i) a closed end channel 34 within the back surface 22r of the curved neck tube 22, (ii) a longitudinally extending finger 28 unitarily formed with the second collar 24 and extending inwardly and downwardly from the second collar 24 for slidable engagement within the channel 34, (iii) a pair of transversely opposed, longitudinally extending, closed end grooves 36 positioned on either side of the channel 34, and (iv) transversely extending pivot pins 30 extending from a distal end (unnumbered) of the finger 28 for slidable engagement within the grooves 36. The channel 34 extends from an open end (unnumbered) at the first end 22a of the curved neck tube 22 to a closed end (unnumbered) proximate a position on the curved neck tube 22 at which the curved neck tube 22 begins to curve. Similarly, the grooves 36 each extend from an open end (unnumbered) at the first end 22a of the curved neck tube 22 to a closed end (unnumbered) intermediate the ends of the channel 34. The closed end of each groove 36 is positioned relative to the pivot pins 30 so that the pivot pins 30 will slide within the grooves 36 for a defined distance as the second retention collar 24 sides along the curved neck tube 22, without contacting the closed end of the grooves 36. A notch 32 is provided in the first retention collar 18 to accommodate finger 28 when the first 18 and second 24 retention collars are aligned and positioned proximate one another in the rest position, as shown in FIG. 6.

The pivot pins 30 are cooperatively engaged within the grooves 36 so as to limit the degrees of freedom within which the head 16 can move relative to the curved neck tube 22. The pivot pins 30 thereby define the axis (not shown) about which the second retention collar 24 pivots as the collar 24 moves along the curved neck tube 22, and prevents the second retention collar 24 from becoming cocked relative to the curved neck tube 22 and hanging up on the tube 22.

The curved neck tube 22 may be configured to provide any desired maximum angle $\alpha$ before continued movement of the head 16 is prevented by stop 26. A maximum angle $\alpha$ of approximately 60° has been found to provide a realistic effect.

The entire doll 10, including the neck assembly 12, should be sufficiently sturdy to withstand rough handling by frustrated care providers. Hence, the materials of construction and the means for attaching the various components should be selected to ensure that the doll 10 will survive such anticipated abuse.

The retention collars 18 and 24 and curved neck tube 22 may be formed from a number of suitable materials including metals, such as aluminum and steel, and plastics such as polyacrylates (PA), acrylonitrile-butadiene-styrene terpolymers (ABS), and polyvinyl chloride (PVC).

A sensor is provided to detect positioning of the head 16 in an unacceptable flopped or bent position. Any sensor capable of reliably detecting positioning of the head 16 in a flopped position and transmitting a bent-neck signal to a central processing unit 50 for reporting a bent-neck occurrence by emitting a perceptible signal, such as a scream, and/or recording the bent-neck occurrence data for subsequent review by an educator or other administrator. Exemplary sensors include specifically, but not exclusively, mechanical switches such as a toggle switch, magnetic sensors, optical sensors, etc.

The sensor can be positioned so as to be actuated and sense a bent-neck occurrence at any desired angle $\alpha$ so long as the angle $\alpha$ bears at least some resemblance to the angle at which injury is likely with an actual infant. The trip angle $\alpha$, below which the head is sensed in an acceptable position and above which the head is sensed in an unacceptable position, is preferably between about 30° and 70°, most preferably between about 45° and 60°. A trip angle of less than 30° can result in false reporting of a bent-neck occurrence as such angles can be reached during normal safe handling of an infant, while trip angles of greater than 70° can result in missed reporting of a bent-neck occurrence as less severe angles are often indicative of a lack of proper head support.

A specific example of a suitable mechanical sensor is shown in FIG. 2. A mechanical switch 40, connected to a central processing unit 50 by lead wires 42, is provided on the smoothly curved side 22f of the curved neck tube 22 proximate the second end 22b of the neck tube 22. The switch is actuated when the head 16 reaches a flopped or bent position proximate the second end 22b of the curved neck tube 22 and sends a bent-neck signal to the central processing unit 50.

The head position sensor can also be configured to sense the duration of a bent-neck episode, (i.e., the length of time the head 16 remains in an unacceptable position) and transmitting such duration data to the central processing unit 50. The duration data may be used to establish the intensity and/or duration of the perceptible signal generated during the bent-neck episode (e.g., a cry for the first two minutes followed by a piercing scream thereafter until the head 16 is returned to an acceptable position), and/or simply recorded for subsequent review by an educator or other administrator (e.g., duration of each bent-neck episode occurring within an assignment period or total duration of all bent-neck episodes occurring within an assignment period).

The neck assembly 12 may also optionally b e equipped with a sensor (not shown) capable of measuring the force with which the head 16 is allowed to flop from an acceptable position to an unacceptable position and transmitting such force data to the central processing unit 50. The force data, as with the duration data, may be used to establish the intensity and/or duration of the perceptible signal generated in response to the bent-neck occurrence (e.g., a short cry for a bent-neck occurrence effected with minor force, a long loud cry for a bent-neck occurrence effected with modest force, and a scream followed by an extended period of crying for a bent-neck occurrence effected with significant force), and/or simply recorded for subsequent review by an educator or other administrator.

Such force data may also be used by the central processing unit 50 to reduce the recording of false bent-neck occurrences (i.e., instances when the head 16 is properly supported but happens to reach the trip angle at a slow speed) by preventing the recording of a bent-neck occurrence, even though the head 16 reaches the trip angle and activates the position sensor 40, unless the force exerted by the head 16 also exceeds a predetermined threshold indicative of mishandling or neglect. Similar control on the reporting of false bent-neck occurrences can be achieved by (i) strongly biasing the toggle switch 40 away from the curved neck tube 22 to prevent tripping of the switch 40 unless the second retention collar 24 reaches the toggle switch 40 with sufficient force to overcoming the biasing force on the switch 40, and/or (ii) biasing the head 16 towards the normal rest position, such as with a spring (not shown) extending through the bore (unnumbered) of the curved neck tube 12 and connected to both the head 16 and the torso 14, wherein the force exerted by the biasing means would need to be exceeded in order for the head 16 to reach the trip angle.

Exemplary sensors include specifically, but not exclusively, linear motion rheostats or a series of binary switches actuated at different angles $\alpha$. Both of these sensors would be effective for sensing and recording or reporting acceleration of the head 16 as the head 16 moves along the curved neck tube 22.

The neck assembly 12 is particularly suited for use in a fully monitored infant simulator of the type disclosed in U.S. Pat. No. 5,443,388 issued to Jurmain et al. The infant simulator of Jurmain et al. includes a central processing unit and appropriate sensors for sensing and recording a variety of data relevant to care of the infant (e.g., number of crying episodes and the interval between initiation of crying and satisfaction of necessary care requirements).

Use

The infant simulator 10 is used to train persons to properly support the head of a young infant by simply assigning the infant simulator 10 to the person for an assignment period, typically 24 to 72 hours.

When the infant simulator 10 is constructed and programmed to generate a distress signal in response to the sensing of a bent-neck occurrence, the person is provided with immediate feedback as to their performance in supporting the head 16 of the doll 10.

When the infant simulator 10 is constructed and programmed to record bent-neck occurrence data and/or bent-neck-duration data, such data can be reviewed by an educator or other instructor at the end of the assignment period and discussed with the person to whom the doll 10 had been assigned.

The specification is provided to aid in the complete nonlimiting understanding of the invention. Since many variations and embodiments of the invention may be created and devised without departing from the spirit and scope of the invention, the scope of the invention resides in the claims hereinafter appended.

I claim:

1. A method for training a person to properly support the head of a young infant, comprising assigning an infant simulator to a person for an assignment period, the infant simulator comprising:

(a) a doll having at least a torso and a head floppily connected to the torso by a neck linkage allowing the free rearward repositioning of the head relative to the torso, as between an acceptable contented position and an unacceptable, harmful, rearwardly bent position;

(b) a means effective for sensing the flopped position of the head relative to the torso as between the acceptable position and the unacceptable position; and (c) a data recording means in communication with the head-position sensing means effective for recording a sensed positioning of the head in an unacceptable position as bent-neck occurrence data.

2. The method of claim 1 wherein the infant simulator further comprises a means in communication with the head position sensing means for generating a perceptible distress signal when the head is sensed in an unacceptable position.

3. The method of claim 1 or 2 further comprising a means for measuring the force required to stop continued movement of the head when the head flops from an acceptable position to an unacceptable position, and a data recording means in communication with the force measuring means for recording the measured force as data.

4. The method of claim 3 further comprising a means in communication with the head-position sensing means and the force measuring means for permitting recording of a bent-neck occurrence only when both (i) the head is sensed in an unacceptable position, and (ii) a force indicative of negligent handling is measured by the force measuring means as the head moved to the sensed unacceptable position; whereby gentle repositioning of the head from an acceptable position to an unacceptable position does not result in the recording of a bent-neck occurrence.

5. The method of claim 4 wherein the head-position data recording means and bent-neck episode duration measuring means are effective for recording the number of bent-neck occurrences and the total duration of all bent-neck episodes occurring within an assignment period as data.

6. The method of claim 1 or 2 wherein the infant simulator further comprises a data recording means effective for measuring and recording the duration of a bent-neck episode as data.

7. The method of claim 1 or 2 wherein the doll has a shape and weight of an infant.

8. The method of claim 1 or 2 further comprising an instructor reviewing data recorded during the assignment period, and discussing the data with the person to whom the infant simulator had been assigned.

9. A method for training a person to properly support the head of a young infant, comprising assigning the infant simulator of claim 1 or 2 to a person for an assignment period.

10. A method for training a person to properly support the head of a young infant, comprising assigning an infant simulator to a person for an assignment period, the infant simulator comprising:

(a) a doll, including a torso and a head;

(b) a curved neck tube;

(c) a neck tube retention system, comprising:
   (1) a first opening in the torso, including a first means for receiving a first end of the neck tube; and
   (2) a second opening in the head, including a second means for receiving a second end of the neck tube;
   (3) wherein at least one of the first and second receiving means slidably engages the curved neck tube; and (d) a guide means for restricting relative movement of the head relative to the torso between a first position wherein the head is aligned with the torso, and a second position wherein the head is tilted back relative to the torso;

(e) whereby the head is gravitationally biased toward the first position when the torso is in a generally vertical position and gravitationally biased toward the second position when the torso is in a generally horizontal position.

11. The method of claim 8, further comprising:

(a) a means effective for sensing positioning of the head at the second position; and (b) a data recording means in communication with the head-position sensing means for recording a sensed positioning of the head proximate the second position as data.

12. The method of claim 10 or 11, further comprising:

(a) a means effective for sensing positioning of the head relative to the torso; and (b) a means in communication with the head-position sensing means for generating a perceptible distress signal when the head approaches the second position.

13. The method of claim 10 or 11 wherein the doll has a shape and weight of an infant.

* * * * *

UNITED STATES PATENT AND TRADEMARK OFFICE
CERTIFICATE OF CORRECTION

PATENT NO. : 6,089,873
DATED : July 18, 2000
INVENTOR(S) : Jurmain et al

It is certified that error appears in the above-identified patent and that said Letters Patent is hereby corrected as shown below:

<u>Column 3,</u>
Line 49, "Definitions p" should be -- Definitions --
Line 49, After "Definitions" begin new paragraph <u>Column 7,</u>
Line 24, "angel a" should be -- angle $\alpha$ --
Line 59, "b e equipped" should be -- be equipped --

Signed and Sealed this

Fourth Day of December, 2001

Attest:

NICHOLAS P. GODICI
*Attesting Officer*   *Acting Director of the United States Patent and Trademark Office*